Figure 1:
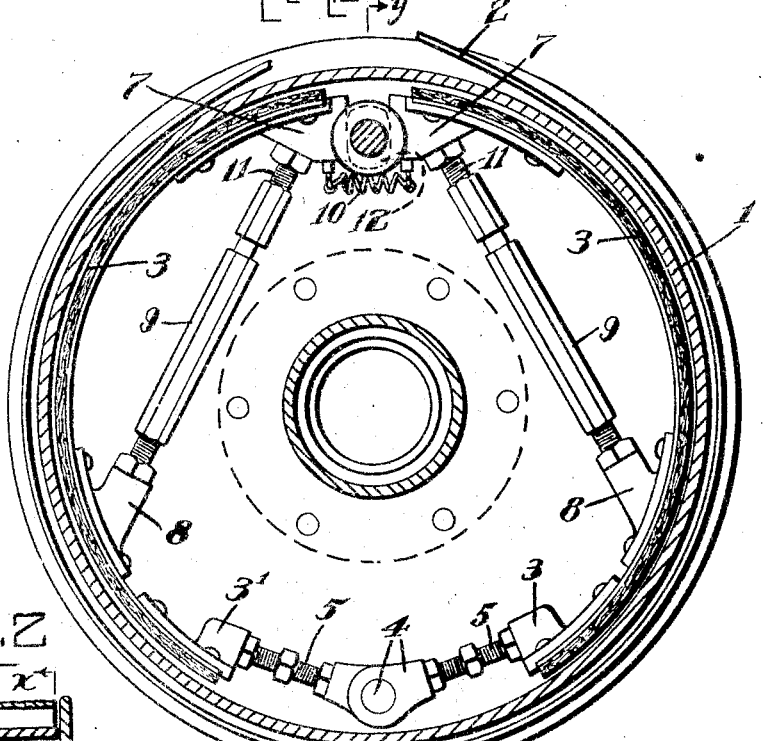

Aug. 18, 1925.

G. H. STONER

BRAKE

Filed Jan. 3, 1925

1,550,399

2 Sheets-Sheet 1

Inventor
George H. Stoner

By Attorney

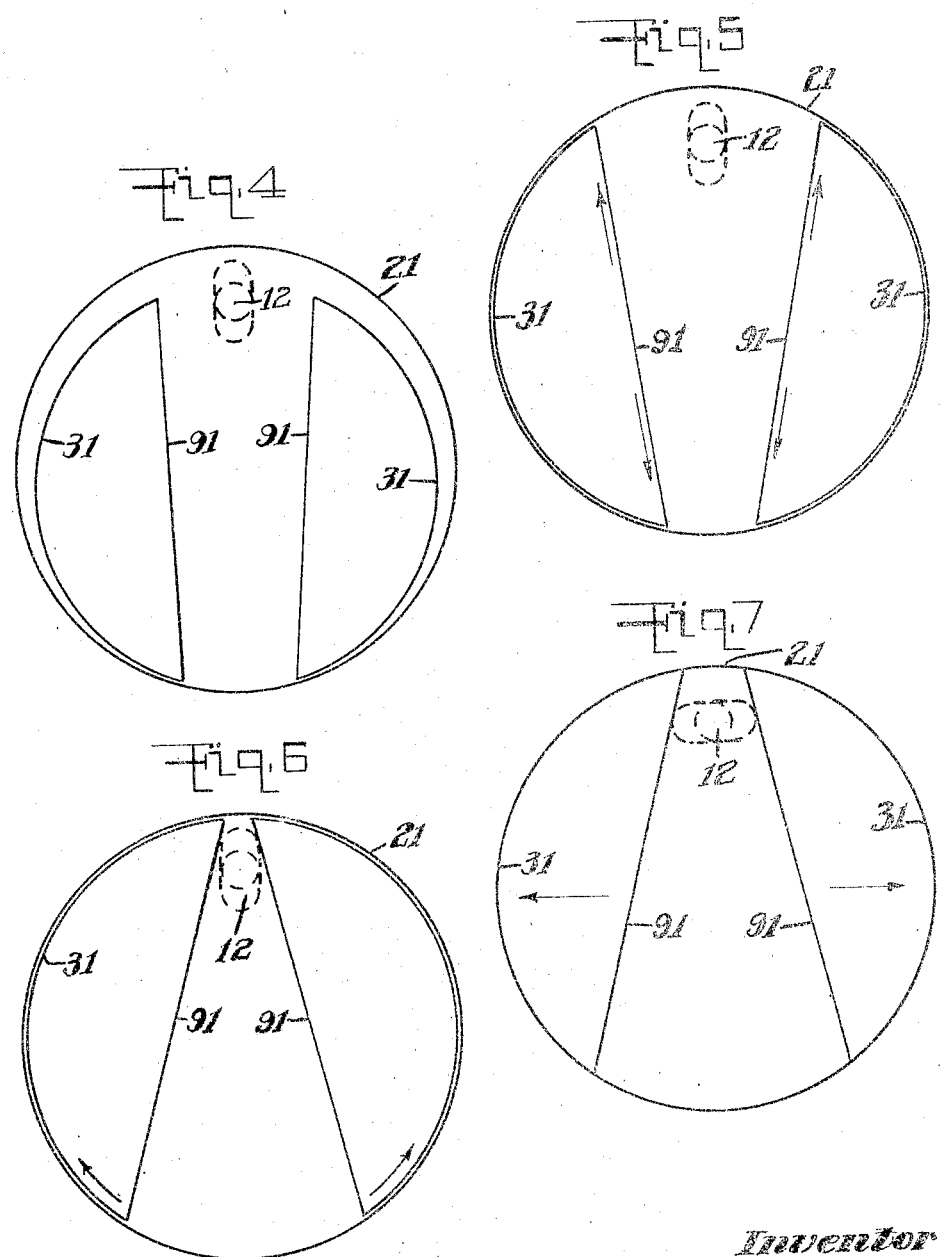

Patented Aug. 18, 1925.

1,550,399

UNITED STATES PATENT OFFICE.

GEORGE H. STONER, OF EAST BOSTON, MASSACHUSETTS.

BRAKE.

Application filed January 3, 1925. Serial No. 304.

*To all whom it may concern:*

Be it known that I, GEORGE H. STONER, a citizen of the United States, residing at East Boston, county of Suffolk, Commonwealth of Massachusetts, have invented certain new and useful Improvements in Brakes, of which the following is a specification.

My invention as herein involved relates to brakes and particularly to those of expanding type such as are installed in automobiles and like vehicles.

Much difficulty has been experienced with such brakes in regard to inequalities of wear and difficulties of adjustment with the result that it has been difficult, if not impossible, to maintain the efficiency of such brakes for any considerable period of use.

In such brakes much difficulty has been experienced in devising expansion members which would under given conditions apply uniform or nearly uniform radial resistance to the brake drum. To supply such a brake and such an internal expansion apparatus has been the urge of my thought. I have provided for general principles and at the same time have devised specific apparatus of immediate and practical utility in solving some of the brake problems of standard automobile construction as appears in automobile use.

In accordance with my invention I am able to provide a simple and effective brake having a great uniformity of bearing surface and having a wide range of adjustment which can be very easily made to take up such wear as is inevitable.

My invention is therefore to be considered not only as a brake but as a braking mechanism capable of installation or substitution in existing cars and particularly in certain cars to which its immediate applicability will be obvious to those skilled in the art.

As illustrative of my invention I have shown in the accompanying drawings a form of brake which I have found to be very efficient and one which can be readily embodied in a new car or substituted in an old car without any increase in expense and with a considerable ultimate saving.

Throughout the specification and drawings like reference characters are employed to indicate corresponding parts, and in the drawings:—

Fig. 1 is a side elevation partly in section of brake in accordance with my invention.

Figure 2:
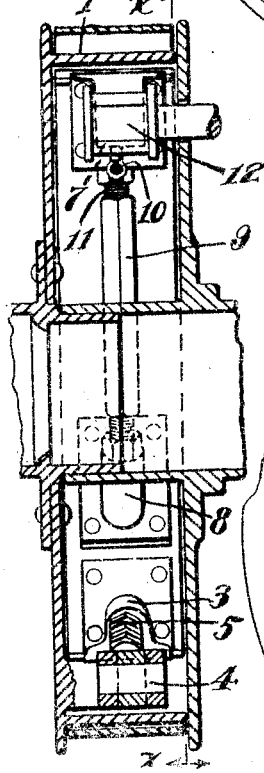

Fig. 2 a central vertical section.

Figure 3:
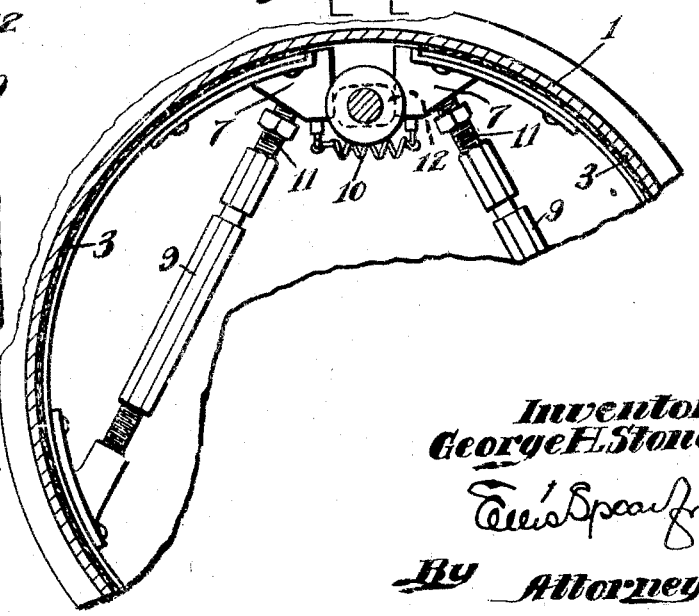

Fig. 3 a fragmentary view like Fig. 1 but with the member expanded, and

Figs. 4, 5, 6 and 7 are diagrammatic views illustrating individual and relative adjustability of the segments.

I have indicated at 1 the usual brake drum of an automobile wheel, and at 2 a portion of the usual external contracting band operating thereon. Within such a drum I provide as an expansion member a construction which is in part rigid and in part flexible, as will be hereinafter described.

Primarily, my expansion member consists of flexible or resilient bands or strips 3—3 which are united by a hinge member 4 to which they are adjustably connected by threaded studs 5 reversely threaded at their opposite ends into the blocks $3^1$ and one of the hinge members 4. On each one of the bands 3 I rivet a pair of members 7 and 8. The member 8 is tapped to receive a reversely threaded adjusting screw 9 the other end of which is tapped into the member 7 so as to provide for the adjustment of these members. The two members 7 are yieldingly held together in contracted position by a spring 10. The members 7 are also tapped to receive bearing studs 11 adapted to be contacted by an operating cam 12 which is rocked in the usual manner to expand the brake structure to give braking contact with the drum 1.

When properly adjusted my brake gives great uniformity of contact and consequently uniformity of wear. It, however, is naturally subject to ultimate wear of the linings and when such wear necessitates adjustment the expansion member may be restored to its original perfection of adjustment by inserting between the bearing studs 11 a block of the major thickness of the cam 12 and in then taking up on the adjustment screw 9 until the bands 3 have been brought out to a true circular shape.

To compensate for the inevitable wear of the cam 12 on the blocks 7, as well as to make readjustment after recurving the segments, the studs 11 may be adjusted so that no shimming or welding of additional bearing surface is required. The studs 5 simply peripherally relocate the segments 3 until their end blocks 7 are in proper relation to the cam 12. When the cam 12 is actuated it forces apart the blocks 7, the resultant force through the connection 9 moving the entire segment outward as a unit. This movement is substantially radial and the bands 3 respond to it to effect a substantially uniform braking action.

The foregoing adjustment may be best understood in its geometrical characteristic by reference to the diagrammatic Figs. 4 to 6. In these figures I have indicated by the circle 21 the outline of the brake drum. Inscribed in this circle 21 are two arcs 31 which are drawn intentionally in non-conforming relation to the circle 21 to indicate a theoretical position of the expansion members of the brake when in properly adjusted position. Connecting the ends of these arcs I have drawn lines 91 which constitute chords for the arcs and indicate the lines of chord adjustment in flexing or changing the curvature of the arcs 31.

In Fig. 5 I have shown the arcs 31 so adjusted by expansion as indicated by the arrows to bring their open ends adjacent to the cam 12 indicated in dotted lines in the diagram. This corresponds generally to the position of the parts shown in Fig. 1 of the drawings.

In Fig. 7 I have shown the segments 31 and 91 expanded by the cam 12. By the resolution of the force so exerted these segments are moved substantially radially outward as indicated by the arrows so as to give a maximum of uniformity in the contact of the arc surfaces with the enclosing circle 21. The diagram in Fig. 7 is intended to correspond generally with the position of the parts shown in Fig. 3.

My expansion members may be substituted in certain standard brakes replacing more cumbersome rigid parts. All that is necessary to do is to remove these specific rigid expansion members and substitute my strips 3, slipping the hinge member 4 over the usual pintle and adjusting the bearing studs 11 to proper operative position with the operating cam. This replacement can be made in less time and with less expense than is required in relining and readjusting certain standard brakes which do not have uniform bearing nor an internal adjustment.

Various modifications may obviously be made in the design of the blocks and the character of the adjustments, without departing from the spirit of my invention if within the limits of the appended claims.

What I therefore claim and desire to secure by Letters Patent is:

1. In a brake of the class described, an expansion member comprising a pair of flexible band segments pivotally mounted adjacent an end of each, a bearing adjacent the opposite end of each of said segments, means for adjusting each segment with reference to a subtended chord, and means for relatively moving the segments circumferentially with reference to an enclosing brake drum.

2. In a brake, an expansion member comprising a flexible band segment, and a rigid adjusting piece effectively disposed with reference thereto in the line of a subtending chord, a hinge member for supporting said segment, and means for positively adjusting said segment relatively to said hinge.

3. In a brake of the class described, an expansion member comprising a flexible band, a pair of rigid members permanently connected adjacent the ends thereof, an adjustable rigid strut between said rigid members, a hinge member and an adjustable connection between one of said expansion members and said hinge member.

4. In a brake of the class described, an expansion member therein comprising a pair of flexible band segments, means for adjustably bending said flexible segments, a hinge member connecting the segments, and adjusting means in the hinge member for circumferentially adjusting them with reference to an enclosing brake drum.

5. An expansion member for a brake, comprising a pair of flexible arc shaped bands, means for adjusting the curvature of said bands, and means for adjusting the bands circumferentially with relation to a substantially concentric enclosing circle.

6. In a brake mechanism, a pair of expansion members each comprising a flexible arc shaped band, means for adjusting the curvature of said bands, means for adjusting the bands circumferentially with relation to a substantially concentric enclosing brake drum, and means for expanding the band segment to engage the drum.

7. In a brake of the class described, an expansion member comprising a pair of flexible band segments hinged in relative circumferential adjustment at one end of each, a block permanently connected adjacent the ends of each of said segments, and an adjustable rigid strut between the block pairs of each segment, and an operating bearing on the free end of each segment and disposed in opposition to each other.

8. In a brake of the class described, an expansion member comprising a pair of flexible band segments hinged together at one end of each, a block permanently connected adjacent the ends of each of said segments, and an adjustable rigid strut between the block pairs of each segment, and an adjusting piece carried at the first mentioned end of each segment and connected in adjustable opposition to each other.

9. In a brake, a brake drum having an internal friction shoe including an arc member, means for positively adjusting the effective radius of said arc member, an expanding device for said shoe, and means for relative circumferential co-operative adjustment between the shoe and the expansion device.

In testimony whereof I affix my signature.

GEORGE H. STONER.